United States Patent
Rolfes

(10) Patent No.: US 6,263,780 B1
(45) Date of Patent: Jul. 24, 2001

(54) COFFEE BREW CONE RETAINING APPARATUS

(76) Inventor: Patrick J. Rolfes, 2006 Seadrift Dr., Corona Del Mar, CA (US) 92625

( * ) Notice: Subject to any disclaimer, the term of this patent is extended or adjusted under 35 U.S.C. 154(b) by 0 days.

(21) Appl. No.: 09/564,688

(22) Filed: May 4, 2000

(51) Int. Cl.[7] ................................................. A47J 31/00
(52) U.S. Cl. .............................. 99/307; 99/304; 99/279; 99/323
(58) Field of Search .......................... 99/307, 306, 305, 99/304, 308, 309, 295, 302 R, 293, 279, 323

(56) References Cited

U.S. PATENT DOCUMENTS

| | | | |
|---|---|---|---|
| 3,479,949 | * 11/1969 | Reynolds et al. | 99/295 X |
| 4,759,273 | * 7/1988 | Kauffman | 99/295 X |
| 5,063,836 | 11/1991 | Patel . | |
| 5,404,794 | 4/1995 | Patel et al. . | |
| 5,555,791 | * 9/1996 | McNeill et al. | 99/304 X |
| 5,836,236 | 11/1998 | Rolfes et al. . | |
| 5,875,703 | 3/1999 | Rolfes . | |

* cited by examiner

Primary Examiner—Reginald L. Alexander
(74) Attorney, Agent, or Firm—Gordon K. Anderson

(57) ABSTRACT

A coffee brew cone retaining device that maintains compression of a brew cone (40) onto the underside of a commercial coffee brewer which consists of a spray head holder (20) that has been modified to include a pair of downward depending legs (30) and (32) one located on each side. A torsion spring tape rail (38) is installed, preferably with threaded fasteners (50), onto each side of the spray head holder directly beneath the legs (30) and (32) and functions by supporting and maintaining the coffee brew cone tightly against the bottom (24) of the holder. The brew cone is modified by adding a raised peripheral lip (58) on the top surface of the mounting flange (56) which encircles the cones tapered interior. The lip slides easily on the bottom of the holder and wipes off moisture in the form of condensate when the cone is removed. The rail retains a tight grip on the flange while maintaining a close relationship between the lip and the holder thus providing the wiping action for removal of the moisture from the holder.

7 Claims, 2 Drawing Sheets

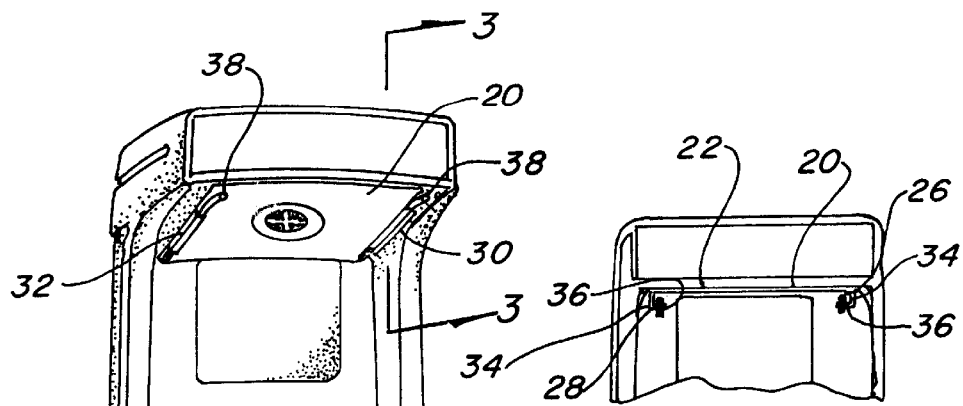
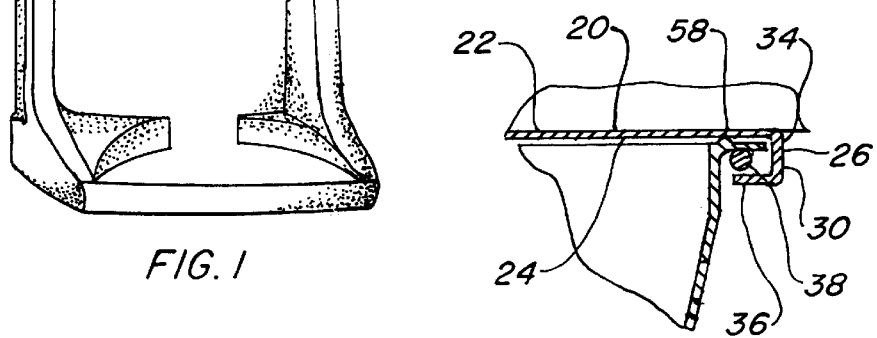
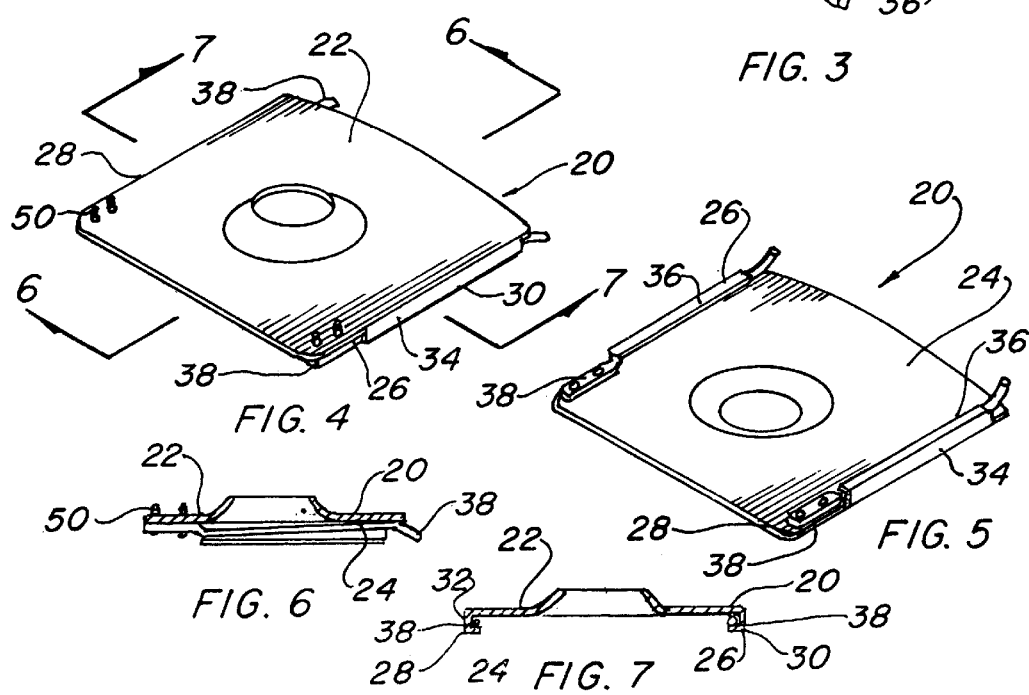

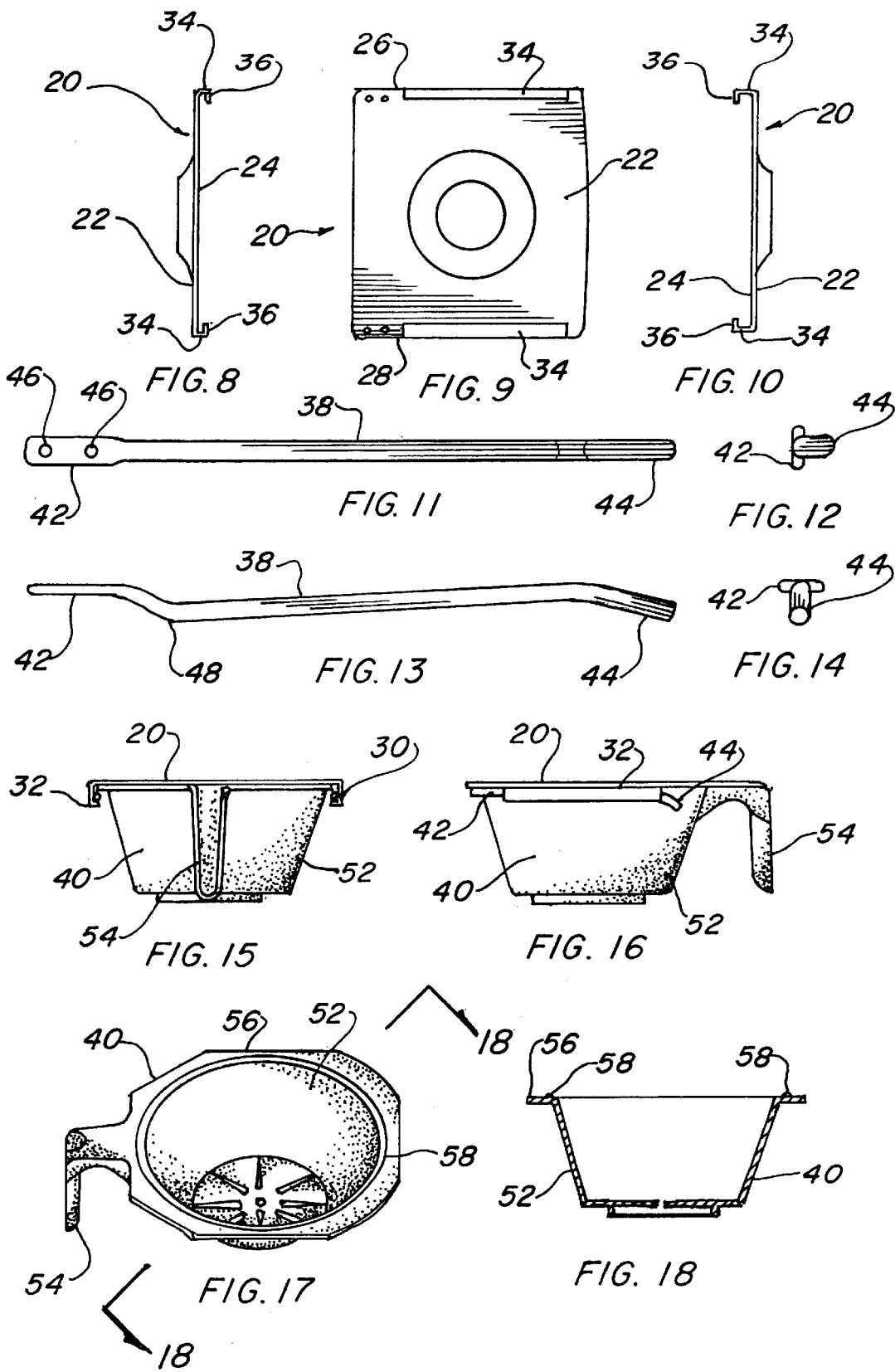

COFFEE BREW CONE RETAINING APPARATUS

TECHNICAL FIELD

The present invention relates to coffee brewers in general. More specifically to a set of rails to hold a brew cone tightly against a spray head retainer to preclude moisture saturated air and steam from escaping during operation and to wipe off any accumulated condensation when the brew cone is removed.

BACKGROUND ART

Previously, many types of coffee brewing apparatus have been developed for use in brewing coffee for commercial establishments. As part of the peripheral equipment required to brew coffee it is customary to place coffee grounds in a porous filter which is held in place by some type of retainer. The typical retainer is a brew cone in the shape of the filter having a small hole in the bottom to drain the coffee after it is brewed.

Prior art in the past has used a thermoplastic brew cone with a flat flange on the top which is held slideably in place with some type of mechanical appurtenance which is usually a part of the brewer itself.

A search of the prior art did not disclose any patents that read directly on the claims of the instant invention, however the following U.S. patents are considered related:

| U.S. Pat. No. | Inventor | Issue Date |
| --- | --- | --- |
| 5,875,703 | Rolfes | Mar. 2, 1999 |
| 5,836,236 | Rolfes et al. | Nov. 17, 1998 |
| 5,404,794 | Patel et al. | Apr. 11, 1995 |
| 5,063,836 | Patel | Nov. 12, 1991 |

Rolfes own U.S. Pat. No. 5,875,703 teaches an improvement on a coffee brewer and hot water dispenser which permits larger capacity by the use of a bypass hot water cycle adding a predetermined volume of water to the container and supplementing the control by expanding its capabilities using multiple sequencing of the brew cycle for increasing the volume of brewed coffee. The spray head holder is identical to that described in Rolfes patent No. 5,836,236 and no mention is made of any change in configuration.

U.S. Pat. No. 5,836,236 issued to Rolfes et al., in which the first named inventor is the present inventor, discloses a coffee brewer and hot water dispenser which brews both coffee and also dispensed hot water from a separate system. The enclosure includes a spray head holder that has a channel shaped edge on each side that holds the brew cone in place by gravity and the configuration of the edges permit the flange of the cone to slip in and out easily with no tension at all on the interface.

U.S. Pat. No. 5,404,794 of Patel et al. discloses a coffee making machine having a reservoir connected to an external water supply via a valve which divides the water into separate hot and cold water tanks. Heated water from a boiler is fed into an expansion chamber and then discharged into the ground coffee through a spray head at the end of an expansion chamber. The enclosure is made of a pair of laterally spaced rectangular arms forming a base with a column located at one end which basically houses most of the operating parts of the coffee-making machine. Nothing specific is taught about the mounting of the brew cone however the cone is illustrated in the drawings as being located just under the enclosure's outwardly extending top.

Patel in U.S. Pat. No. 5,063,836 teaches a coffee making machine of the type adapted to be connected to city water supply. The device includes a reservoir having a level sensor controlling a water refill valve to the reservoir and a heating element which heats the water therein. A level sensor functions to permit automatic refill of the reservoir at the appropriate level for subsequent brewing of a full pot of coffee irrespective of the water pressure and the previous route of the water. A solid state circuit board controls the operational sequence and functions of the machine. The device includes a base with a warming plate on which a coffee pot may rest and columns upon which most of the operating components are mounted. There is little if any taught about the method of attaching the brew cone however in viewing the product protected by this patent the cone is retained in a conventional manner using lips on each side to hold the brew cone in place.

DISCLOSURE OF THE INVENTION

Coffee brewing for commercial applications is accomplished by heating water to a temperature just under the boiling point then introducing it through a spray head into a brew cone complete with a filter containing coffee grounds. The heated water is retained by the filter just long enough to accomplish the brewing process where the coffee is drained into a server or pot positioned directly beneath. The brew cone is usually held in place with channel shaped brackets which are configured to retain a flat lip on the upper surface of the cone.

The novelty of the invention serves two basic functions, first the invention seals the cone against the structural frame of the brewer thus eliminating moisture saturated air and steam from leaking between the gap formed by the prior art bracket configurations. Secondly to permit any condensate that has accumulated on the brewer frame to be wiped off when the cone is removed during the emptying process of the removing the filter along with the remaining grounds.

A primary object of the invention is then directed to eliminate the problem caused by this leakage of moisture saturated air and accompanying steam, by maintaining the brew cone in direct contact with the brewer structure under spring pressure. This constant pressure created by spring type rails that eliminate the gap that is normally left in the structure. Even the existence of a small gap may be sufficient to permit leakage into the surrounding atmosphere as the vapor pressure differential is usually sufficient to permit airflow transmission. The reason that sealing the gap has such importance is that the quality of the coffee brewed is notably improved as all of the steam and accompanying heat is captured inside the brewing cone which permits the maximum heat penetration through the coffee grounds since this loss is completely eliminated. It will also be noted that in the competitive field of coffee brewers, quality of taste is extremely significant and the invention does much to enhance this important characteristic.

Another aspect of the primary object is that while the rails hold the cone tightly they are configured to permit the cone to be inserted easily and in a straight line since there is one rail on each side and they are slightly bowed in the middle. This rail contour does not interfere with its positioning ability and is no harder for cone installation or removal. The combination of the resilient rails and the shape of the spray head holder make up most of the rail apparatus as a channel shape is formed in opposed edges of the spray head holder and the rails are positioned within and held tightly against the holder.

An important object of the invention addresses the second problem in that when the cone is removed for replacing the coffee grounds condensate is wiped off. It is normal for hot water and steam to condense on a cold underside of the mechanical structure, particularly if it is made of metal, and will obviously inadvertently fall onto the top of the server. Since the server is positioned directly beneath the cone it may drip on the servers outside surface or on top of the handle, also, if the server is removed or not in a completely closed position the water droplets may fall onto the platform supporting the server. In any event the water dripped onto the surface is unsightly, annoying and unsanitary requiring supplementary cleaning due to the accumulation of liquid, leaving watermarks, dirt stains etc. This object is realized by the combination of the spring tensioning rails and addition of a small integral bead of the parent material integrally formed on the flange completely around the periphery of the cone. This bead is just high enough and near enough to the internal annular distending conduit of the cone to direct the liquid harmlessly inside when the cone is drawn across the wet surface while being removed from the spring loaded bracket.

Another object of the invention is the simplicity of both the rails and the addition of the bead. The rails are actually pre-formed springs made from stainless steel flattened on one end with pierced mounting holes and bent in the middle with an angular bend on the end to guide the cone during insertion. The cone is equally simple as only the mold requires changing to add the upstanding bead. This simplicity solves the problems with little increase in overall cost of the brewing apparatus.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment.

FIG. 2 is a partial front view of the preferred embodiment.

FIG. 3 is an enlarged cross sectional view taken along lines 3—3 of FIG. 1.

FIG. 4 is a partial isometric top view of the spray head holder completely removed from the invention for clarity.

FIG. 5 is a partial isometric bottom view of the spray head holder, completely removed from the invention for clarity.

FIG. 6 is a cross sectional view taken along lines 6—6 of FIG. 4.

FIG. 7 is a cross-sectional view taken along lines 7—7 of FIG. 4.

FIG. 8 is a back view of the spray head holder, completely removed from the invention for clarity.

FIG. 9 is a bottom view of the spray head holder, completely removed from the invention for clarity.

FIG. 10 is a front view of the spray head holder, completely removed from the invention for clarity.

FIG. 11 is a plan view of a rail completely, removed from the invention for clarity.

FIG. 12 is a front view of a rail viewed from the top, completely removed from the invention for clarity.

FIG. 13 is a side elevation view of a rail, completely removed from the invention for clarity.

FIG. 14 is a front view of a rail completely, removed from the invention for clarity.

FIG. 15 is a front view of a brew cone installed in a spray head holder both, completely removed from the invention for clarity.

FIG. 16 is a side view of a brew cone installed in a spray head holder both, completely removed from the invention for clarity.

FIG. 17 is a partial isometric top view of the brew cone, completely removed from the invention for clarity.

FIG. 18 is a cross sectional view taken along lines 18—18 of FIG. 17 illustrating the structure of the brew cone,

BEST MODE FOR CARRYING OUT THE INVENTION

The best mode for carrying out the invention is presented in terms of a preferred embodiment. This preferred embodiment is shown in FIGS. 1 through 18 and is comprised of a spray head holder 20 that includes a top 22, a bottom, 24 a right side 26 and a left side 28. The spray head holder 20 is normally an integral part of a commercial coffee brewer and, as its name implies retains the spray head that distributes the hot water from the brewer. This holder 20 is located just under the top 22 on an extending shelf as illustrated in FIG. 1 and is attached to the brewer by conventional means such as threaded fasteners, rivets or the like and is preferably fabricated of stainless steel in sheet form. The construction techniques normally used in its fabrication is to first shear the sheet into a convenient size, blank the material into its finished outline using a steel rule die and then to finally form opposed edges with a machine tool brake. A downwardly depending leg 30 is formed on the right side and also similar downwardly depending leg 32 is likewise formed on the left side of the spray head holder 20 being in opposed mirror image of each other as illustrated in FIGS. 1 to 10.

The legs 30 and 32 are each configured with an integral vertical flange 34 and a integral horizontal flange 36, forming a channel like shape on each side. The horizontal flanges 36 face each other as illustrated best in FIGS. 7, 8 and 10. It should be noted that each downward depending leg 30 and 32 has a width between the holder bottom 24 and each horizontal flange 36 of a thickness at least equal to the of a combined brewing cone flange and a torsion spring type rail, which will be discussed later, however, the purpose of the legs 30 and 32 is to protect these elements and to act as a guide for the brewing cone. Further each horizontal flange 36 has a width which is at least equal to the rail width. It should be realized that the horizontal flanges 36 are not necessary for complete operational functioning of the invention, however, they do add considerable protection and preclude any potential problems created by the user exerting excessive force in a downward direction that may permanently deform the rails. It is realized that some prior art coffee brewers have similar spray head holders that function in the same manner nevertheless the invention uses this holder in conjunction with other elements to create a different type of utility and therefore is of importance in the direction of the overall operational sequence and its accompanying structure.

A torsion spring type rail 38, as mentioned previously, is disposed linearly adjacent to the inside surface of each leg 30 and 32 as depicted in FIGS. 2 to 7. The rails 38 have sufficient strength and resiliency to support a brew cone 40 containing a filter and coffee grounds. The torsion spring type rail 38 is preferably fabricated of stainless steel and has a length essentially the same as that of the spray head holder and is almost covered by the legs 30 and 32, with the exception that both ends are exposed to view from the outside. The torsion spring type rail 38 has a first end 42 and a second end 44 with the first end 42 flattened and includes a number of holes 46 through the flattened portion as illustrated in FIGS. 11 and 12. The second end 44 is bent downward to act as a guide for inserting the brew cone 40 between the rails and the spray head holder 20, best depicted in FIG. 1. The rails further contain a radial bow 48 formed by bending in the middle to create torsional pressure when deformed downwardly sufficiently to retain the brew cone 40 between the rails 38 and the bottom 24 of the spray head holder 20. Attachment means in the form of threaded fasteners 50 connect each rail 38 to the spray head holder 20, as shown in FIGS. 1, and 4 through 6. The attachment means may also be by riveting or some other method well known in the art. It may be easily visualeed that the rails 38 are actually springs configured to spread outwardly from the rigid holder 20 as they are held tightly only on the flattened first end 42.

The brew cone 40 employed in the invention is basically the same as used in prior art for decades which basically consists a tapered cone shaped body 52 with a small hole in the bottom, a handle 54 and a mounting flange 56 integrally formed around the top surface which is formed as a structural member for mounting the cone onto a coffee brewer. While the brew cone 40 itself is not new, the invention has modified the cone by adding a raised peripheral lip 58 on the upper portion, or top surface, of a mounting flange 56 which encircles the cones tapered interior. This lip 58 is important as it provides a pointed ridge that is contiguous with the bottom 24 of the spray head holder 20 which by itself is flat and smooth. The lip 58 is small and sharp enough to slide easily on the bottom of the holder 20 particularly as it is round and its presence permits any moisture in the form of condensate to be easily wiped off when the cone 20 is removed. It should be noted that when the cone 20 is removed the rail 38 retains a tight grip on the flange 56 while maintaining a close relationship between the lip 58 and the holder 20 thus providing the wiping action for removal of the moisture from the holder 20. It has been found that the brew cone peripheral lip 58 is best raised above the top surface of the flange 56 with a full radius from 0.015 inches (0.381 mm) to 0.020 inches (0.508 mm), which permits the optimum wiping action to be realized. It may be possible to achieve some wiping action with other types of brew cones 40 permitting the invention to be employed with only the rails 38 used to accomplish the desired end result of sealing the potential leakage and the secondary result may still function even though not as defined as possible.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A coffee brew cone retaining apparatus for holding a brew cone tightly under compression against a commercial coffee brewer to prevent saturated air leakage and to avert dripping when the cone is removed, comprising:

a spray head holder having a top, a bottom, a right side and a left side attached to and forming a part of a commercial coffee brewer, said spray head holder having a downwardly depending leg on the right side and also a downwardly depending leg on the left side in opposed mirror image of each other, a torsion spring type rail disposed linearly adjacent to an inside surface of each leg, and said rail having sufficient strength and resiliency to support a brew cone containing a filter and coffee grounds, wherein said torsion spring type rail is defined by having a first end and a second end with the first end flattened having a plurality of holes on the flattened portion and the second end bent downward to act as a guide for inserting a brew cone, also said rail having a bow in the middle to create torsional pressure when bent downwardly sufficiently to retain a brew cone between the rail and the spray head holder, and attachment means to connect each rail to the spray head holder.

2. The coffee brew cone retaining apparatus as recited in claim 1 wherein said attachment means to connect each rail to the spray head holder further comprises, threaded fasteners.

3. The coffee brew cone retaining apparatus as recited in claim 1 further comprising, a brew cone having a raised peripheral lip on an upper portion of a mounting flange encircling said cones tapered interior.

4. The coffee brew cone retaining apparatus as recited in claim 3 wherein said brew cone raised peripheral lip is raised from 0.015 inches (0.381 mm) to 0.020 inches (0.508 mm) from the brew cone mounting flange.

5. The coffee brew cone retaining apparatus as recited in claim 3 wherein said brew cone raised peripheral lip is configured having a full radius.

6. A coffee brew cone retaining apparatus for holding a brew cone tightly under compression against a commercial coffee brewer to prevent saturated air leakage and to avert dripping when the cone is removed, comprising:

a spray head holder having a top, a bottom, a right side and a left side attached to and forming a part of a commercial coffee brewer, said spray head holder having a downwardly depending leg on the right side and also a downwardly depending leg on the opposed left side in mirror image of each other, a torsion spring type rail disposed linearly adjacent to an inside surface of each leg, and said rail having sufficient resiliency to support a brew cone containing a filter and coffee grounds, attachment means in the form of threaded fasteners for connecting each rail to the spray head holder, and a brew cone having a raised peripheral lip held in place the by said rails contiguously engaging the spray head holder precluding leakage and dripping.

7. A coffee brew cone retaining apparatus for holding a brew cone tightly under compression against a commercial coffee brewer to prevent saturated air leakage and to avert dripping when the cone is removed, comprising:

a spray head holder attached to a coffee brewer having a pair of legs protruding from a bottom, a torsion spring type rail attached on the spray head holder adjacent to each leg for holding a brew cone tightly against the brewer, and a brew cone having a raised peripheral lip held in place with the rails.

* * * * *